(12) United States Patent
Burgstaler et al.

(10) Patent No.: US 7,108,444 B2
(45) Date of Patent: Sep. 19, 2006

(54) MOUNTING DEVICE FOR PEDALS IN MOTOR VEHICLES

(75) Inventors: Andree Burgstaler, Dielingen (DE); Jan Dütz, Damme (DE); Simone Pätzold, Cappeln (DE)

(73) Assignee: ZF Lemförder Metallwaren AG, Dielingen (DE)

( * ) Notice: Subject to any disclaimer, the term of this patent is extended or adjusted under 35 U.S.C. 154(b) by 151 days.

(21) Appl. No.: 10/149,688

(22) PCT Filed: Nov. 22, 2001

(86) PCT No.: PCT/DE01/04360

§ 371 (c)(1),
(2), (4) Date: Jun. 11, 2002

(87) PCT Pub. No.: WO02/42651

PCT Pub. Date: May 30, 2002

(65) Prior Publication Data

US 2003/0002918 A1    Jan. 2, 2003

(30) Foreign Application Priority Data

Nov. 24, 2000 (DE) .............................. 100 58 561

(51) Int. Cl.
*F16C 11/06* (2006.01)

(52) U.S. Cl. ...................... 403/150; 403/151; 403/329; 403/364

(58) Field of Classification Search ................ 403/150, 403/151, 154, 157, 161, 162, 311, 321, 325, 403/326, 329, 364; 74/512, 513, 560, 562.5
See application file for complete search history.

(56) References Cited

U.S. PATENT DOCUMENTS

| 1,131,085 | A |   | 3/1915  | Reilly |
| 2,292,128 | A |   | 8/1942  | Casey |
| 3,091,795 | A |   | 6/1963  | Budwig |
| 3,451,288 | A |   | 6/1969  | Barton et al. |
| 4,096,920 | A | * | 6/1978  | Heyn |
| 4,354,298 | A |   | 10/1982 | Tanaka et al. |
| 4,637,741 | A |   | 1/1987  | Gillet |
| 4,648,738 | A |   | 3/1987  | Thielen |
| 4,810,145 | A |   | 3/1989  | Villas |
| 4,819,500 | A | * | 4/1989  | Musumiya et al. ........... 74/513 |
| 4,883,319 | A | * | 11/1989 | Scott ........................... 403/162 |
| 4,884,930 | A |   | 12/1989 | Döbbeler |
| 4,896,990 | A |   | 1/1990  | Nakamura et al. |
| 5,069,586 | A |   | 12/1991 | Casey |

(Continued)

FOREIGN PATENT DOCUMENTS

CH        583 841        1/1977

(Continued)

*Primary Examiner*—Daniel P. Stodola
*Assistant Examiner*—Victor MacArthur
(74) *Attorney, Agent, or Firm*—McGlew & Tuttle, PC

(57) ABSTRACT

A fastening device for pedals in motor vehicles has a supporting bolt (8) which is accommodated at each of its free ends in a mounting point (5, 5A) of a pedal block (2). The bolt (8) has, between the mounting points (5, 5A), a mounting point for the pedal. The pedal mounting point is arranged in a hole (7) of the pedal body (2). The supporting bolt (8) comprises two bolt halves (9, 10), which are locked with one another in the assembled state by an elastic snap holder (11). The bolt halves (9, 10) are fixed by at least one stop (13) with respect to their position to the pedal.

24 Claims, 4 Drawing Sheets

U.S. PATENT DOCUMENTS

| | | | |
|---|---|---|---|
| 5,588,338 A | * | 12/1996 | Carr et al. .................... 74/513 |
| 5,829,317 A | | 11/1998 | Vreeken et al. |
| 5,855,146 A | | 1/1999 | Papenhagen et al. |
| 5,871,286 A | * | 2/1999 | Kern et al. |
| 5,921,144 A | | 7/1999 | Williams, Jr. et al. |
| 5,957,030 A | | 9/1999 | Keller et al. |
| 2002/0184749 A1 | | 12/2002 | Burgstaler et al. |

FOREIGN PATENT DOCUMENTS

| | | |
|---|---|---|
| DE | 40 40 151 | 7/1991 |
| DE | 40 13 284 A1 | 10/1991 |
| DE | 195 31 733 | 2/1997 |
| DE | 196 15 487 C1 | 5/1997 |
| DE | 297 03 980 | 5/1997 |
| EP | 0 581 648 A1 | 2/1994 |
| EP | 0 625 453 | 11/1994 |
| EP | 0 659 615 | 6/1995 |
| EP | 0 827 874 | 3/1998 |

* cited by examiner

MOUNTING DEVICE FOR PEDALS IN MOTOR VEHICLES

FIELD OF THE INVENTION

The present invention pertains to a fastening device for pedals in motor vehicles with a supporting bolt, which is accommodated at each of its free ends in a mounting point of a pedal block and has a mounting point for the pedal between these mounting points, wherein this mounting point is arranged in a hole of the pedal body.

BACKGROUND OF THE INVENTION

Various embodiments of fastening devices of the type described are used in both passenger cars and trucks. The supporting bolts used to mount the pedals usually consist of metal and have various designs in terms of their embodiment and position relative to the pedal block accommodating the pedals and the supporting bolt.

For example, the metal bolts used may be pressed on one side into the pedal block and may be provided with a knurling on the opposite mounting side accommodated in the pedal block. The pressing and knurling of the metal bolt guarantee that it will not change its position under any operating conditions and especially also in case of an accident. Furthermore, metal bolts provided with a securing element, e.g., a retaining ring, instead of a knurling, and in which fixation of the position is thus brought about, have been known from the prior art. Furthermore, embodiments designed as threaded bolts with a stop on one side, which are fixed by means of a nut, are also known as supporting bolts.

It is common to all exemplary embodiments described that they are designed such that they remain in their position in case of an accident, and the pedal mounted by means of the supporting bolt is possibly removed from the area of the foot of the vehicle's driver due to rotation around this supporting bolt.

Moreover, there are fastening devices known under the name pedal release system in the prior art, in which the walls of the pedal block are enlarged in their original distance from each other in case of an accident, so that the supporting bolt mounted on both sides in the walls and the pedal fastened thereto are released in order to reduce the risk of accident in the area of the driver's foot. The knurlings or securing elements mentioned are, of course, to be designed in such fastening systems such that they will not offer any substantial resistance in case of an accident to the forces now occurring to widen the pedal block. The drawback of all existing systems is that a plurality of manufacturing steps are necessary for fixing the supporting bolt for mounting the pedal on the pedal block.

SUMMARY OF THE INVENTION

The technical object of the present invention is to offer a remedy to the problems noted and to provide a fastening device of the type described in the introduction, which makes possible the manufacture of the individual parts of the fastening at low cost and also guarantees the simple and time-saving mounting of a pedal on the corresponding pedal block.

According to the present invention a fastening device for pedals in motor vehicles has a supporting bolt which is accommodated at each of its free ends in a mounting point (or mounting region) of a pedal block. The bolt has, between the mounting points, a mounting point or mounting region for the pedal. The pedal mounting point is arranged in a hole of the pedal body. The supporting bolt comprising two supporting bolt halves, which are locked with one another in the assembled state by an elastic snap holder, the bolt halves being fixed by a stop with respect to their position to the pedal. This design according to the present invention permits the simple assembly of the entire fastening device, such that the bolt halves are pushed laterally from the outside into the respective mounting points of the pedal block and they also engage at the same time the hole of the pedal arranged centrally between the mounting points of the pedal block. The bolt halves are introduced to the extent that the snap holder arranged at the ends of the bolt halves, which ends face one another, will lock, and the fixation of the position of the entire bolt is brought about at the same time by at least one stop, preferably inside the hole of the pedal body. Fixation of the position of the supporting bolt is thus guaranteed.

It proved to be particularly advantageous to manufacture the bolt halves of the supporting bolt as hollow plastic cylinders, with the snap holder comprising at least two tooth projections locking in the axial longitudinal direction of the bolt halves, such that one tooth projection is arranged on the inner side of a hollow cylindrical bolt surface and the other tooth projection is arranged on the outer wall of the corresponding second hollow cylindrical bolt half. To increase the locking forces, a plurality of tooth projections may be arranged, in addition, at the ends of the bolt halves at regularly spaced locations from one another. If, moreover, tooth projections, distributed over the circumference, are arranged on the inner side of one hollow cylindrical bolt half and tooth projections are arranged on the outer side of the same hollow cylindrical bolt half, the two bolt halves used can be manufactured in this manner as identical parts, which substantially reduces the manufacturing costs as a consequence of the manufacture of only one press mold.

Moreover, provisions are made in an advantageous embodiment of the fastening device for the stop for fixing the supporting bolt to be formed by a projection arranged in the hole of the pedal body and a corresponding recess arranged in the outer side of the supporting bolt composed of the bolt halves. The projection may comprise in this case a single dog or, having a circular shape, it may be designed as a pocket, just like the recess in the supporting bolt, or as a circular groove arranged in the outer side of the bolt.

The assembly of the bolt halves may be facilitated by the tooth projection arranged on the outer side of one bolt half being provided at its front free end with a chamfer. This chamfer facilitates the introduction of the tooth projections into the hollow hole of the corresponding other bolt half.

An exemplary embodiment of the subject of the present invention will be explained in greater detail below on the basis of the attached drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
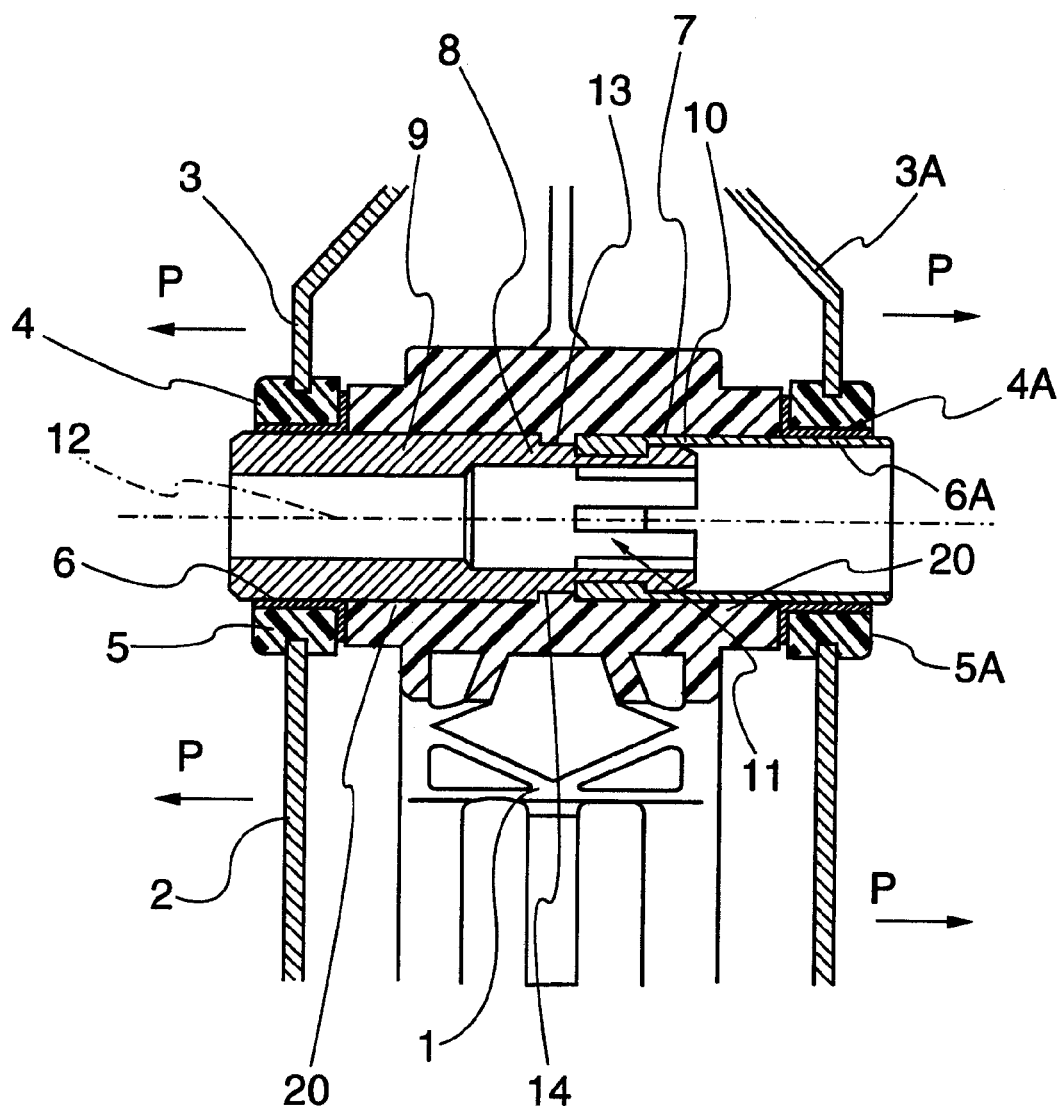
FIG. 1 is a synoptic sectional view of the fastening device for a pedal of a motor vehicle.

Referring to the drawings in particular, the fastening device shown in FIG. 1 for mounting a pedal body 1 comprises essentially a pedal block 2 and a supporting bolt 8 mounted within the pedal block 2. In the exemplary embodiment being shown, the pedal block 2 comprises a profiled sheet metal part with two side cheeks 3, 3A. A respective hole 4 and 4A is provided in the side cheeks 3, 3A. A respective mounting point part 5 and 5A is injected as an injection-molded plastic part into the respective hole 4 and 4A. To mount the supporting bolt 8, the mounting point parts 5 and 5A have an inserted slide bearing bush 6 and 6A, respectively.

As is apparent from FIG. 1, the supporting bolt 8 is accommodated with its respective free ends in a slide bearing bush 6 and 6A, and the pedal body 1 with a through opening 7, through which the supporting bolt 8 extends, is located between the mounting points and the side cheeks 3, 3A of the pedal block 2.

The supporting bolt 8 comprises, in turn, two bolt halves 9 and 10, which are locked with one another with a snap holder 11 arranged at the ends of the bolt halves 9 and 10. The ends of the bolt halves 9 and 10 point toward one another.

Furthermore, it also appears from FIG. 1 that the supporting bolt 8 comprising the bolt halves 9, 10 is fixed in its position in the direction of the longitudinal axis 12 of the supporting bolt by a stop 13 arranged within the hole 7 of the pedal body 1. The stop 13 is designed as a circular projection protruding into the interior space of the hole 7 in this exemplary embodiment. Corresponding to this, a circular recess 14 designed as a groove is located in the supporting bolt 8. The supporting bolt 8 has an outer surface with a pedal mounting region 20.

Figure 2:
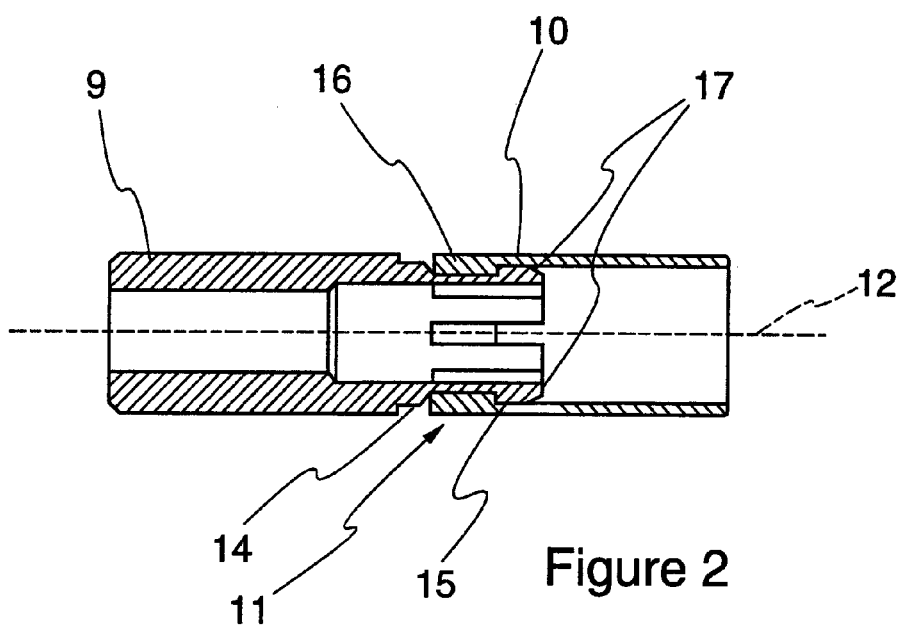
FIG. 2 is a sectional view through the two bolt halves of a supporting bolt according to the present invention.

FIG. 2 shows clearly that the bolt halves 9, 10 are designed as hollow cylinders. The snap holder 11 for locking the bolt halves 9, 10 comprises essentially tooth projections 15 on the bolt half 9 and tooth projections 16 on the bolt half 10, which tooth projections are locked with one another. The tooth projection 15 is located on the outer side of the bolt 9 in this embodiment. The tooth projection 16 protrudes into the inner hole of the bolt half 10. To achieve a sufficient locking effect, a plurality of tooth projections, distributed symmetrically over the circumference, are located on the respective outer and inner sides of the bolt halves 9 and 10 in the exemplary embodiment being shown.

To facilitate the introduction of the bolt half 9 into the inner hole of the bolt half 10 during the locking operation of the two parts with one another, the tooth projections 15 have chamfers 17 on their free front ends.

The synoptic view in FIG. 1 shows clearly that the exemplary embodiment of the fastening device according to the present invention being shown is designed especially for use as a pedal release system. As was mentioned above, such a system is designed such that in the case of an accident, the side cheeks 3, 3A of the pedal block 2 are deformed due to suitable measures such that they move laterally outward in the direction of the arrows P in FIG. 1. The lateral offset is so great that the supporting bolt 8 accommodated in the bearing points 5 and 5A is completely released. Due to the weight of the pedal body 1, the release of the supporting bolt 8 causes the pedal to drop off, so that the pedal is prevented from penetrating into the leg room of the vehicle in question.

The release of the supporting bolt may, of course, also take place if, e.g., the bolt halves 9 and 10 are provided at their free ends located outside the mounting point 5, 5A with steps, which hold the supporting bolt 8 in its position, on the one hand, and, on the other hand, do not offer any substantial resistance to the lateral outward movement of the side cheeks 3, 3A in case of an accident. The stop design shown in FIG. 1 thus represents only one possible embodiment variant of the present invention.

Figure 3A:
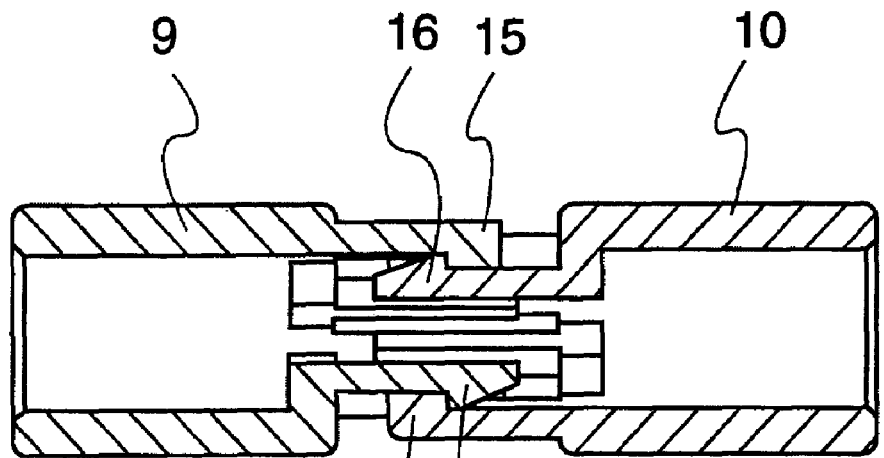
FIG. 3A is a partial sectional view of an embodiment of a supporting bolt.
Figure 3B:
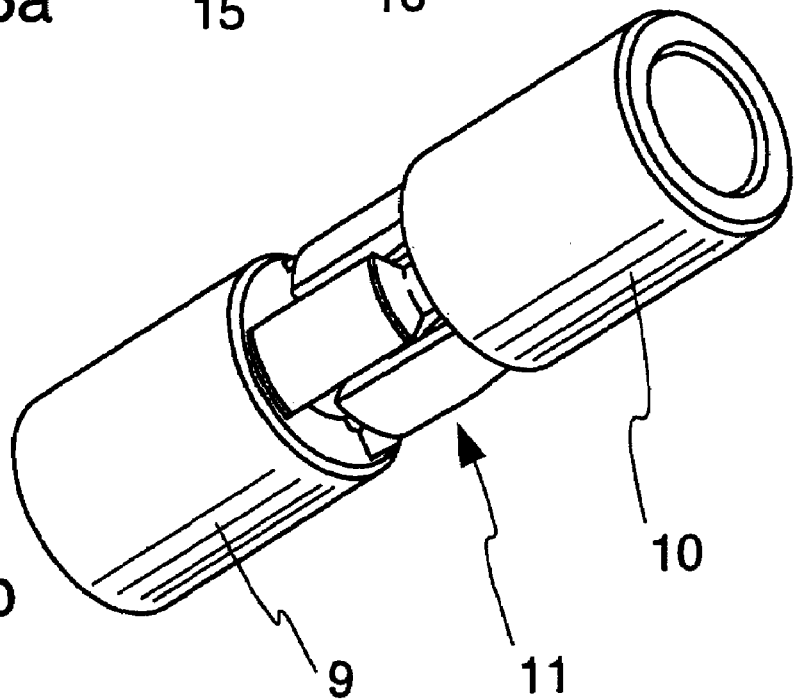
FIG. 3B is perspective view of the supporting bolt embodiment of FIG. 3A showing the spatial arrangement.
Figure 3C:
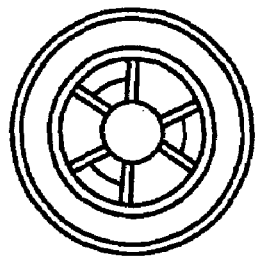
FIG. 3C is an end view of the supporting bolt embodiment of FIG. 3A.
Figure 4A:
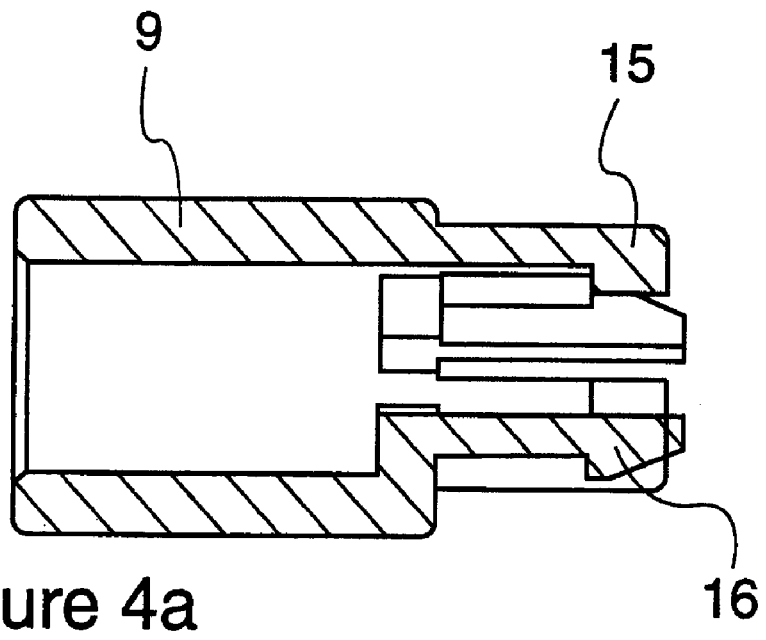
FIG. 4A is a partial sectional view of another embodiment of a supporting bolt showing a supporting bolt half.
Figure 4B:
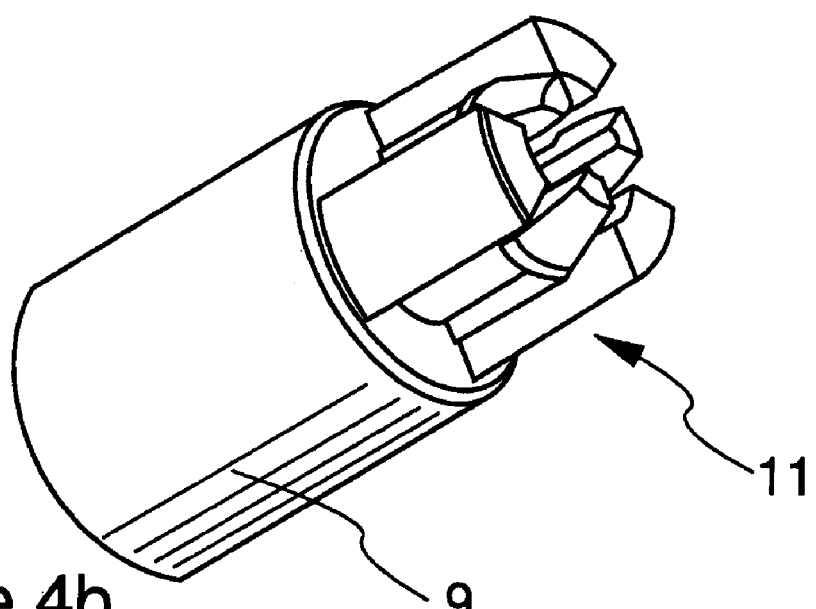
FIG. 4B is perspective view of the supporting bolt half of FIG. 4A showing the spatial arrangement.
Figure 4C:
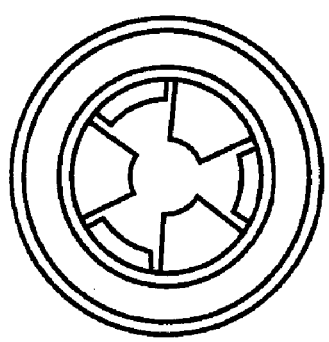
FIG. 4C is an end view of the supporting bolt embodiment of FIG. 4A.

In other embodiments of the present invention, as they are shown, e.g., in FIGS. 3 and 4, tooth projections 16 are arranged alternatingly, distributed over the circumference, on the inner side of one bolt half 9 or 10 and tooth projections 15 are arranged at the same time on the outer side of the same bolt half 9 or 10. The bolt halves 9 and 10 being shown are designed as identical parts, so that only one injection mold is to be provided for manufacturing same.

While specific embodiments of the invention have been shown and described in detail to illustrate the application of the principles of the invention, it will be understood that the invention may be embodied otherwise without departing from such principles.

The invention claimed is:

1. A fasting device for pedals in motor vehicles, the device comprising:

a pedal body with a stop and with a mounting opening;

a pedal block with two mounting point portions with each of said mounting point portions having an inner diameter;

a supporting bolt comprising a two-part bolt having two bolt halves, each bolt half having a free end accommodated in a separate one of said two mounting point portions with a greatest outer diameter of said supporting bolt being less than or equal to said inner diameter of each of said two mounting point portions such that said supporting bolt is slidably and rotatably accommodated relative to each of said two mounting portions with respective free ends of said supporting bolt in the mounting point portions, said supporting bolt having a pedal mounting region, between said free ends and between said mounting point portions, said pedal mounting region being arranged in said mounting opening of said pedal body, said supporting bolt being hollow to define a free space that is free of elements penetrating therein, said two bolt halves being directly locked with one another in an assembled state by an elastic snap holder arranged at ends of the bolt halves, said ends facing one another, wherein said bolt halves are fixed with respect to a position to said pedal body by said stop.

2. A fastening device in accordance with claim 1, wherein said two bolt halves are manufactured as identical hollow plastic cylinder parts.

3. A fastening device in accordance with claim 2, wherein said snap holder of said two bolt halves have alternatingly tooth projections distributed over a circumference on an inner side of a cylinder hole of one bolt half and tooth projections on an outer side of the same bolt half.

4. A fastening device in accordance with claim 3, wherein a plurality of said tooth projections are arranged at regularly spaced locations and are arranged on a circumference of said bolt halves.

5. A fastening device in accordance claim 1, wherein one bolt half has a hollow cylindrical hole and said snap holder comprises at least two tooth projections locking in the direction of an axial longitudinal axis of said bolt halves with one tooth projection arranged on an inner side of the hollow cylindrical hole of the one bolt half and another tooth projection arranged at the outer wall of a corresponding second bolt half.

6. A fastening device in accordance with claim 5, wherein a plurality of said tooth projections are arranged at regularly spaced locations and are arranged on a circumference of said bolt halves.

7. A fastening device in accordance with claims 5, wherein said tooth projection arranged on the outer side of one said bolt half has a chamfer at said tooth projections front free end.

8. A fastening device in accordance with claim 1, wherein said stop comprises a projection arranged in said open of said pedal body and a corresponding recess arranged in the outer side of said supporting bolt in an assembled state.

9. A fastening device in accordance with claim 8, wherein the projection has a shape extending circularly in said opening and said recess is a circular groove arranged in the outer side of said supporting bolt.

10. A fastening device in accordance to claim 1, wherein said pedal block comprises a profiled sheet metal part with two side cheeks, and each of the side cheeks is provided with one of the mounting point portions.

11. A fastening device in accordance to claim 1, wherein said each mounting point portion comprises a slide bearing bush, and said supporting bolt is accommodated with its free ends in the slide bearing bushes.

12. A fastening device in accordance to claim 1, wherein said free ends of the supporting bolt protrude on the outer sides of the pedal block.

13. A fastening device in accordance to claim 1, wherein said pedal block comprises a profiled sheet metal part with two side cheeks; a respective hole is proved in each of the side cheeks; the respective mounting point portion is injected as an injection-molded plastic part into the respective hole; said sliding bushes are inserted in said mounting point portion respectively, and said supporting bolt is accommodated with its respective free ends in the slide bearing bushes.

14. A fastening device in accordance to claim 13, wherein the cross section of each slide bearing bush has an L-shape.

15. A fastening device in accordance to claim 13, wherein said free ends of the supporting bolt protrude on the outer sides of the side cheeks, the outer sides facing away one another.

16. A fastening device in accordance to claim 13, wherein said side cheeks of the pedal block move laterally outward in a direction to cause said supporting bolt to be released completely from the bearing points and said pedal to drop off thereof.

17. A fastening device in accordance to claim 1, wherein said free space extends from one of said free ends to the other of said free ends.

18. A fastening device in accordance to claim 1, wherein said supporting bolt has a longitudinal axis and said free space is a free through hole extending along said longitudinal axis.

19. A motor vehicle pedal fastening arrangement comprising:
a motor vehicle pedal body having a hole;
a motor vehicle pedal block with first and second mounting portions;
a supporting bolt comprising a two-part bolt having two bolt halves, each bolt halve having a fee end supported by said first and second mounting portions of said motor vehicle pedal block, said supporting bolt having a motor vehicle pedal mounting region between said mounting portions, said motor vehicle pedal mounting region being arranged in said hole of said motor vehicle pedal body, said supporting bolt two bolt halves having an elastic snap holder for locking the halves with one another in an assembled state, wherein said supporting bolt is fixed in a direction of a longitudinal axis of said supporting bolt, in a supporting bolt position, by a stop arranged within the hole of said motor vehicle pedal body, said supporting bolt being hollow to define a free hole that is free of elements penetrating therein.

20. A fastening device in accordance with claim 19, wherein said two bolt halves are manufactured as identical hollow plastic cylinder parts.

21. A fastening device in accordance claim 20, wherein said snap holder comprises at least two tooth projections locking in the direction of an axial longitudinal axis of said bolt halves with one tooth projection arranged on an inner side of the hollow cylindrical hole of one bolt half and another tooth projection arranged at the outer wall of a corresponding second bolt half.

22. A fastening device in accordance with claim 20, wherein said snap holder of said two bolt halves comprises alternating tooth projections distributed over a circumference on an inner side of a cylinder hole of one bolt half and tooth projections on an outer side of the same bolt half.

23. A fastening device for pedals in motor vehicle, the device comprising:
a pedal body;
a pedal block with mounting point portions;
a supporting bolt composing a two-part bolt with a first bolt part slidably and rotatably accommodated at a supporting block free end in one of said mounting point portions of said pedal block and a second bolt part slidably and rotatably accommodated at another supporting block free end in the other of said mounting point portions of said pedal block, said supporting bolt defining an outer a pedal mounting region, between said mounting point portions, and an interior hollow free space that is free of elements penetrating therein, said pedal mounting region being arranged in a hole of said pedal body, said first bolt part and said second bolt part being directly locked with one another in an assembled state by a first elastic snap holder element arranged at a facing end of said first bolt part and a second elastic snap holder element arranged at a facing end of said second bolt part, said first elastic snap holder element and said second elastic snap holder element being arranged in said hole of said pedal body, said supporting bolt being fixed by at least one stop with respect to a position of said pedal body being fixed in a direction of a longitudinal axis of said supporting bolt, in a supporting bolt position, by a stop arranged within the hole of said pedal body.

24. A fastening device for pedals in motor vehicles, the device comprising:
- a motor vehicle pedal body;
- a motor vehicle pedal block with mounting point portions;
- a supporting bolt slidably and rotatably mounted with respect to said motor vehicle pedal block with supporting bolt free ends disposed rotatably and slidably in said mounting point portions of said motor vehicle pedal block, said supporting bolt having a pedal mounting region, between said mounting point portions, said pedal mounting region being arranged in a hole of said motor vehicle pedal body, said supporting bolt comprising two bolt halves directly locked with one another in an assembled state by an elastic snap holder arranged at ends of the bolt halves, said ends facing one another, wherein said bolt halves are fixed by at least one stop with respect to a position to said motor vehicle pedal body, wherein said stop comprises a projection arranged in said hole of said motor vehicle pedal body and a corresponding recess arranged in the outer side of said supporting bolt between both bolt halves in an assembled state.